United States Patent
Yavorsky et al.

(10) Patent No.: US 7,125,434 B2
(45) Date of Patent: Oct. 24, 2006

(54) DEEP GRADIENT-DENSITY FILTER DEVICE

(75) Inventors: David P. Yavorsky, Bolton, MA (US);
Jonathan Royce, Merrimack, NH (US);
Matthew Alexander Tomasko, Arlington, MA (US); Ven Anantha Raman, Salem, NH (US)

(73) Assignee: Millipore Corporation, Billerica, MA (US)

( * ) Notice: Subject to any disclaimer, the term of this patent is extended or adjusted under 35 U.S.C. 154(b) by 250 days.

(21) Appl. No.: 10/324,774

(22) Filed: Dec. 19, 2002

(65) Prior Publication Data
US 2004/0118765 A1    Jun. 24, 2004

(51) Int. Cl.
*B01D 46/10* (2006.01)

(52) U.S. Cl. ............ 55/486; 55/320; 55/487; 55/498; 95/287; 210/338; 210/348; 210/497.1; 210/493.1; 210/787

(58) Field of Classification Search ........ 55/320, 55/486, 487, 498, 527, 528, 524; 95/287; 210/338, 348, 497.1, 493.1, 767; 96/154; 442/327
See application file for complete search history.

(56) References Cited

U.S. PATENT DOCUMENTS

| | | | |
|---|---|---|---|
| 4,197,205 A | | 4/1980 | Hirs |
| 4,488,969 A | | 12/1984 | Hou |
| 4,511,473 A | | 4/1985 | Hou |
| 4,645,567 A | | 2/1987 | Hou et al. |
| 4,714,647 A | | 12/1987 | Vogt et al. |
| 4,863,602 A | | 9/1989 | Johnson |
| 5,232,595 A | | 8/1993 | Meyer |
| 5,622,537 A | * | 4/1997 | Kahlbaugh et al. ........ 55/320 |
| 5,716,522 A | | 2/1998 | Chilton et al. |
| 5,762,669 A | * | 6/1998 | Kahlbaugh et al. ........ 55/486 |
| 5,762,670 A | * | 6/1998 | Kahlbaugh et al. ........ 55/486 |
| 5,766,288 A | | 6/1998 | Thiele et al. |
| 5,792,227 A | * | 8/1998 | Kahlbaugh et al. ........ 55/486 |
| 5,797,973 A | * | 8/1998 | Dudrey et al. ........... 55/372 |
| 6,019,809 A | * | 2/2000 | Kahlbaugh et al. ........ 55/486 |
| 6,048,464 A | * | 4/2000 | Tanaka et al. .......... 210/767 |
| 6,171,369 B1 | * | 1/2001 | Schultink et al. .......... 95/57 |
| 6,183,536 B1 | * | 2/2001 | Schultink et al. .......... 95/57 |

(Continued)

FOREIGN PATENT DOCUMENTS

GB    1271867    4/1972

OTHER PUBLICATIONS

PCT International Search Report, Int. App. No. PCT/US03/38630, Forms PCT/ISA/210 and 220 (Date of Mailing: Oct. 11, 2004).

*Primary Examiner*—Duane Smith
*Assistant Examiner*—Minh-Chau T. Pham
(74) *Attorney, Agent, or Firm*—Millipore Corporation

(57) ABSTRACT

A deep gradient-density filter device capable of effectively filtering a fluid containing a distribution of particles in the range of approximately 25 microns to approximately 0.2 micron at a fluid velocity of at least approximately 100 cm/hr and an initial hydraulic permeability of greater than approximately 10 cm/hr/psi. The deep gradient-density filter device includes several layers of filtration material, each having specific predetermined particle retention properties. In one product embodiment, the deep gradient-density filter device uses "loose" fibrillated cellulose fiber material as a primary filter element. In a method aspect, the deep gradient-density filter device is used for either the secondary clarification of industrial-scale volumes of cultured or fermented protein-containing biopharmaceutical fluids or the primary clarification of pilot-scale volumes.

15 Claims, 4 Drawing Sheets

U.S. PATENT DOCUMENTS

| | | |
|---|---|---|
| 6,391,200 B1 | 5/2002 | Pulck et al. |
| 6,712,966 B1 | 3/2004 | Pulek et al. |
| 2003/0177909 A1* | 9/2003 | Koslow ........................ 96/154 |
| 2003/0220039 A1* | 11/2003 | Chen et al. ................. 442/327 |

* cited by examiner

DEEP GRADIENT-DENSITY FILTER DEVICE

FIELD

In general, the present invention is directed to a deep gradient-density filter device and, in particular, to a deep gradient-density filter device comprising layers of filtration material well-suited for the primary or secondary clarification of manufactured biopharmaceutical fluids.

BACKGROUND

Depth filters (e.g., gradient-density depth filters) achieve filtration within the depth of the filter material. A common class of such filters are those that comprise a random matrix of fibers, bonded (or otherwise fixed) to form a complex, tortuous maze of flow channels. Particle separation in these filters generally results from entrapment by, or adsorption to, the fiber matrix. In gradient-density depth filters, several fiber-based filter materials (e.g., in mat or pad format) of different average nominal pore size are arranged sequentially in progressively increasing retentiveness.

Current technologies relative to depth filtration, particularly for applications requiring the removal of submicron particles, are limited to comparatively thin layer(s) of filtration material. With respect to common biopharmaceutical applications, the two most popular clarification fiber-based depth filter materials are dry-laid, gradient density, synthetic fiber pads and wet-laid, cellulose fiber sheets (with or without embedded inorganic filter aids). In either case, the overall filter material depth (or thickness) is invariably restricted to less than 10 millimeters (0.394 inches), primarily due to the high hydraulic resistance (i.e., native pressure drop per unit of fluid flow per unit area) of the filter material. Accordingly, to assure an acceptable rapid rate of fluid throughput, fiber-based depth filters based on conventional filter materials and formats are designed with an eye towards maximizing filter surface area.

The conventional predisposition towards use of large surface area filter materials is evident in the wide popularity of the saucer-like lenticular design of conventional fiber-based depthfilters for pharmaceutical and biopharmaceutical fluid clarification processes. See e.g., FIG. 7A. In practice, several of these double-sided "platters" are stacked within an external housing to effect parallel filtration (i.e., contemporaneously by each "platter") of fluid brought into the housing. Examples of this common filter system design can be found in, for example, U.S. Pat. No. 4,783,262, issued to E. A. Ostreicher et al. on Nov. 8, 1988; and U.S. Pat. No. 5,055,192, issued to A. Artinyan et al. on Oct. 8, 1991.

In general, high-area depth filter systems are bulky, prone to poor reliability, and often have high manufacturing costs. An extensive arrangement of media seals is often required to keep the system "tight" and/or non-leaky. And, unlike surface filter media,—such as porous films or membranes which typically can be effectively packaged in a wrapped or pleated cartridge on account of their relative thinness—depth filter media do not tolerate as well the mechanical stresses typical of high surface area cartridge fabrication.

High-area depth filter systems tend also to be slow. It is well known that the filtration performance of a conventional fiber-based depth filter, as measured by filter capacity (i.e., solids loading) or particle retention or both, generally increases as fluid velocity or flux rate decreases. Particle capture—by size and amount—is more generally effective the slower particles travel through a thin filter media. (The mechanism(s) underlying particle capture are not well understood, but likely involve sieving, adsorption, and impingement.) Slow rates (per unit area) also minimize the operating pressures required which at any higher flow rate can be impractical for the high density (low permeability) filter media employed in such applications.

In light of the above, there is a need currently for a compact high-capacity deep gradient-density filter device that is reliable, robust, and easy to manufacture.

SUMMARY

In response to the above need, the present invention provides a deep gradient-density filter device having, in comparison to its functional piers, a more "open" range of nominal pore size throughout the depth of its filtration material, which—despite the seemingly greater intrinsic permeability thereof—provides comparably good retentiveness, on account (at least in part) of the unprecedented thickness of said filtration material. By its emphasis on filter thickness, rather than surface area, the present invention is felt to represent a new and pioneering platform for depth filtration, departing markedly from any known, conventional approaches.

In respect of its product aspects, two basic (potentially overlapping) product configurations are envisaged. The first product configuration (i.e., a deep gradient-density filter) is characterized—among other features—by the quantifiably-defined retention capabilities and the collective thickness (i.e., greater than a half-inch) of its filtration material. The second product configuration (i.e., also a deep gradient-density filter) is characterized—among other features—by its incorporation of fibrillated fiber as a primary filtration material.

More particularly, according to the first product configuration, the deep gradient-density filter device is defined herein as having a depth of at least approximately 0.5 inch (1.27 cm.) and capable of filtering a fluid containing a distribution of particles in the range of approximately 25 microns to approximately 0.2 micron, the deep gradient-density filter device comprising in order: (a) a pre-filtration zone comprising layers of filtration material, said pre-filtration zone capable of retaining particles in the range of approximately 25 microns to approximately 1 micron, (b) a primary filtration zone comprising filtration material, said primary filtration zone capable retaining particles in the range of approximately 1 micron to approximately 0.3 micron, and (c) a polishing zone comprising layers of filtration material, said polishing zone capable of retaining particles in the range of approximately 0.3 micron to approximately 0.2 micron. The retention capabilities of the pre-filtration zone, the primary filtration zone, and the polishing zone, as recited in (a), (b), and (c) respectively, are established at a fluid velocity of at least approximately 100 cm/hr and an initial hydraulic permeability of greater than approximately 10 cm/hr/psi.

In the second product configuration, the deep gradient-density filter device is particularly defined herein as comprising in order: a pre-filtration zone comprising layers of filtration material capable of retaining particles within a first size distribution range; a primary filtration zone comprising at least one layer of fibrillated fiber containing material capable of retaining particles within a second size distribution range smaller than said first size distribution range; and a polishing zone comprising layers of filtration material capable of retaining particles within a third size distribution range smaller than said second size distribution range.

Although potential uses of the deep gradient-density filter device are several, in one preferred application, the deep gradient-density filter is used for the clarification of biopharmaceutical fluids leading to the production of pharmaceuticals and therapeutic biological products. In particular, for those biopharmaceuticals produced from genetically modified and/or otherwise manipulated cells, the deep gradient-density filter device is used in the initial harvest of extracellular products (e.g., soluble proteins) following fermentation and/or cloning. The deep gradient-density filter device is implemented to remove essentially all suspended solids in the harvest to a level sufficient for subsequent effective direct sterile filtration or chromatographic processing (e.g., ion exchange, affinity, etc.).

In light of the above, it is a principal object of the present invention to provide a deep gradient-density filter device that is well-suited for the primary or secondary clarification of a manufactured biopharmaceutical fluid, the filter device being robust, inexpensively manufactured and implemented, and having good capacity and good reliability.

It is another object of the present invention to provide a deep gradient-density filter device, the filter material thereof having a thickness of at least a half-inch (in the direction of the primary flow path through said material).

It is another object of the present invention to provide a deep gradient-density filter device having, among its several component layers, a layer of fibrillated fiber material.

It is another object of the present invention to provide a method for filtering a manufactured biopharmaceutical fluid at a comparatively high and steady fluid velocity utilizing a thick deep gradient-density filter device.

For a fuller understanding of the nature and objects of the present invention, the following detailed description should be considered in conjunction with the accompanying drawings.

BRIEF DESCRIPTION OF THE DRAWINGS

In general, each of FIGS. 1 to 7 provide schematic representational illustrations, predominantly of the invention and/or its capabilities. The relative location, shapes, and/or sizes of objects and/or data plots may be exaggerated to facilitate discussion and presentation herein.

DETAILED DESCRIPTION

The present invention provides a deep gradient-density filter device, characterized by its thick stratified arrangement of generally fiber-based filtration material, the device being particularly useful for the clarification of industrially-produced biopharmaceutical fluids. Among its several possible variations, the device can be configured as a compact, easily installable and replaceable unit that is capable of attaining a degree of filtration performance found currently in substantially larger, bulkier, and more costly depth filters.

Figure 1:
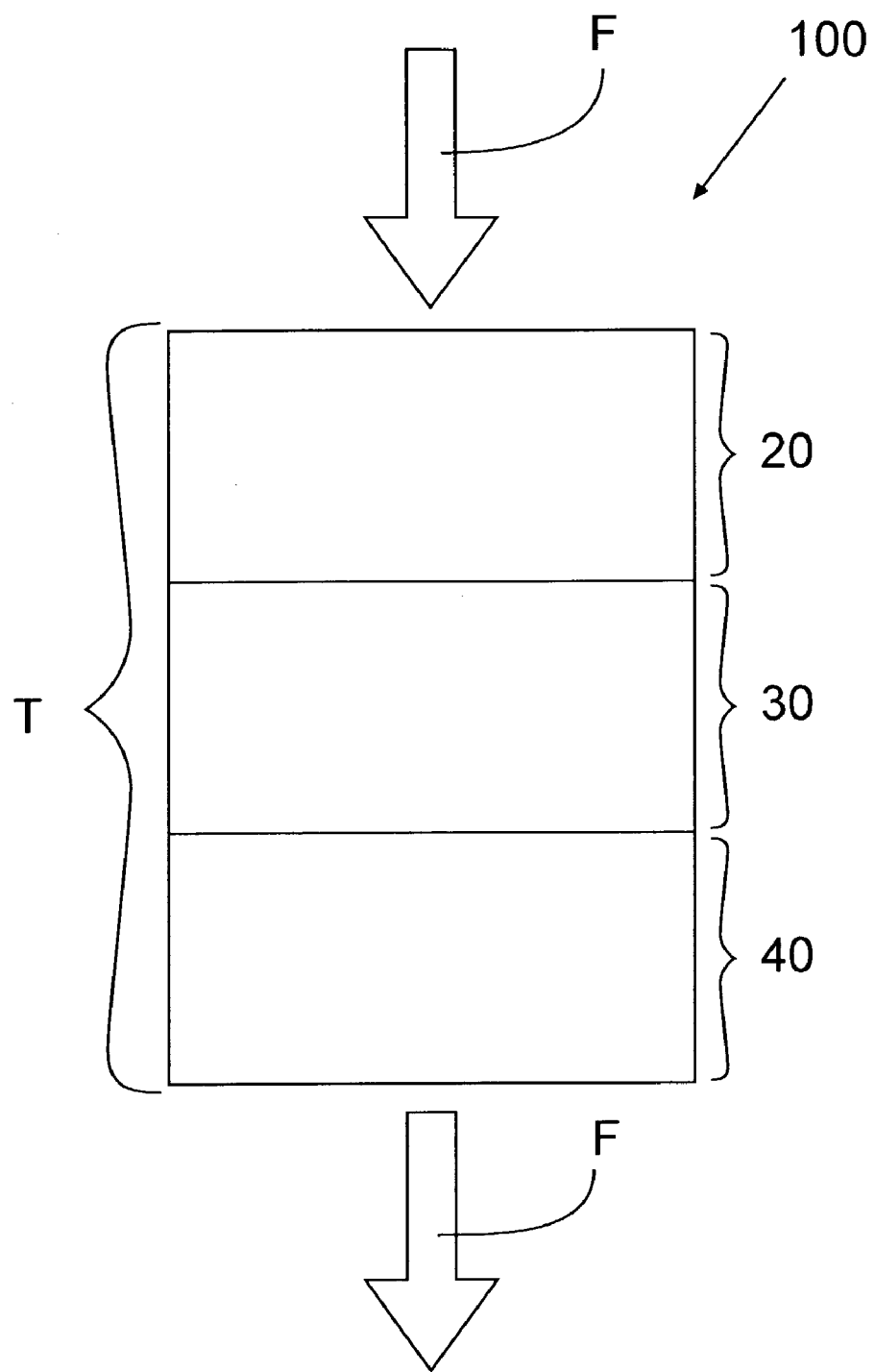
FIG. 1 illustrates schematically a deep gradient-density filter device 100, constructed according to an embodiment of the present invention, comprising a pre-filtration zone 20, a primary filtration zone 30, and a polishing zone 40.

In one embodiment, illustrated in FIG. 1, the deep gradient-density filter device 100 comprises numerous fluid permeable layers of essentially fiber-based filtration material arranged at intervals perpendicular to an intended main fluid current direction F, spaced proximately one behind the other, the stack T either being collectively greater than a half-inch in thickness, or including as its "primary" filter material a layer of fibrillated fiber (cf., primary filtration zone 30). The stack T is desirably tight and dense, but the invention—being rather robust in its design—can tolerate the presence of slight air spaces between layers.

Although the use of highly fibrillated fiber (particularly, loose cotton lint) as the primary filtration material in a gradient-density filter device is felt unprecedented in its own right, even in the embodiment where such materials are employed, filtration performance can be improved if configured according to novel structural criteria (cf. thickness) described herein. This structural criteria produces in general a unitary stack T of filtration material that is markedly thicker than any comparable fiber-based depth filter device known to date, and in many instances, resembles a tube or canister (see, FIG. 7b), rather than the familiar saucer or disk-like appearance of the individual filter units (see, FIG. 7a) often used in multiples in said comparable depth filters. This represents a substantial change in the overall structure of the conventional depth filter from one of limited depth and high frontal surface area to one of far greater depth and proportionally lower frontal area for the same volume of filter material.

The structure of the deep gradient-density filter device 100 can be described in respect of its "frontal area to volume ratio". The frontal area to volume ratio is calculated by dividing the surface area of the leading layer of filtration material by the total volume occupied by the stack of filtration material.

As used herein, the "leading layer" is the layer first impinged upon when fluid is passed through the deep gradient-density filter device. Since in all practical embodiments the layers of filtration material will be stacked one on top of the other, the surface area of each layer should be substantially the same, and hence, the measurement of surface area can be obtained from virtually any layer within the stack.

Figure 7A:
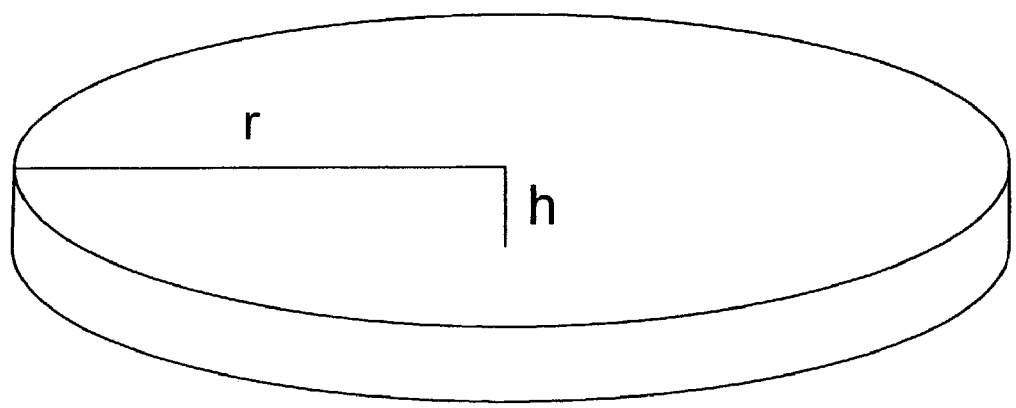
FIGS. 7A and 7B are schematic illustrations of a popular basic overall shape of a prior art fiber-based depth filter unit and the shape of a deep gradient-density filter device 100 according to the present invention.

The frontal area volume ratio in most typical conventional fiber-based depth filter devices used for biopharmaceutical clarifications is approximately 100–300 $m^1$, providing in many instances the comparably thin structure illustrated in FIG. 7A. In accordance with the present invention, the deep gradient-density filter device 100 has a frontal area to volume ratio of [20–80 $m^1$], which will provide in many instances the comparably thick structure illustrated in FIG. 7B.

Figure 6A:
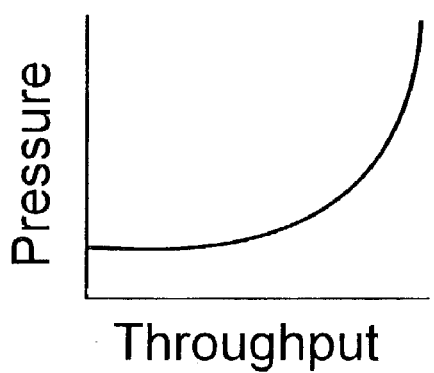
FIGS. 6A and 6B are graphs illustrating the relationship between pressure and throughput in a prior art fiber-based deep filter unit and a deep gradient-density filter device 100 according to the present invention.
Figure 6B:
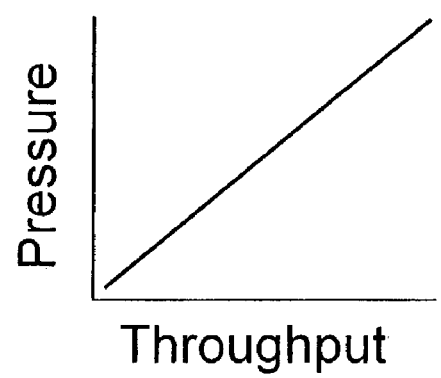

The advantages offered by the present invention are several, one of which—i.e., linear differential pressure growth—is illustrated in FIGS. 6A and 6B.

The graph in FIG. 6A illustrates the relationship between pressure and throughput in a typical fiber-based depth filter (i.e., large frontal surface area devices). In part due to the "tightness" of the filter elements often employed in such filters, a so-called "filter cake" (i.e., particulate sedimentation) can rapidly develop on the surface of such device. Such "face fouling" limits the filtering capacity of the device as process fluid no longer access the internal pores and surfaces of the depth filter media. While initially the fluid pressure seems to remain slight and constant, it mounts quickly and exponentially as the restriction to flow becomes more severe with the accumulation of particulate material. Because the pressure increases exponentially, the point at which pressure exceeds an intrinsic operable limit can approach suddenly, with potential catastrophic breach being abrupt and difficult to predict. In the use of such devices, operators—in the interest of caution—will typically stop filtration well in advance of the critical point. This reduces the practical longevity of the device, as well as requires employment of highly-skilled and vigilant operators.

In a device according to the present invention, the particles are admitted more easily into and increasingly captured within the depth of the filter, rather than collecting on the surface. Although pressure will increase during operation, as shown in FIG. 6B, it is more gradual (i.e., linear), with no significant and abrupt pressure spikes occurring at the tail-end of the device's operative life. Since the device can be used up to the critical pressure limits without fear of sudden and potentially catastrophic failure, the practical longevity of the device is comparatively improved. Vigilance by the operator also need not be as heightened.

While the inventors do not wish to be bound to any theory in explanation of the present invention, it is presently believed that it is the combination of the device's unprecedented structural dimensions and the selection and arrangement of device's filter materials that enables the accomplishment of good particle loading and retention capabilities at unprecedented high fluid velocities and at modest pressure differentials. Whereas under conventional paradigms, filtration efficiency was effected by modulating surface area, the present invention effects filtration efficiency by modulating depth. While the mechanics of particle capture by the thicker inventive structure is not yet well known, it is assumed that—in consideration of heretofore unpracticed filtration conditions—the mechanics are different from prior art mechanisms (e.g., sieving, adsorption, and impingement), and may involve a novel capture mechanism.

As a preferred alternative to frontal area to volume ratio, the inventive deep gradient-density filter device 100 can be more immediately defined in respect simply of its thickness, thickness simply being the reciprocal of said ratio. Thus, it is appropriate to state that the layers of filtration material in a deep gradient-density filter device 100 has a thickness of at least a half-inch. This thickness requirement is true for all embodiments of the deep gradient-density filter device, regardless of the scale of the device.

Figure 7B:
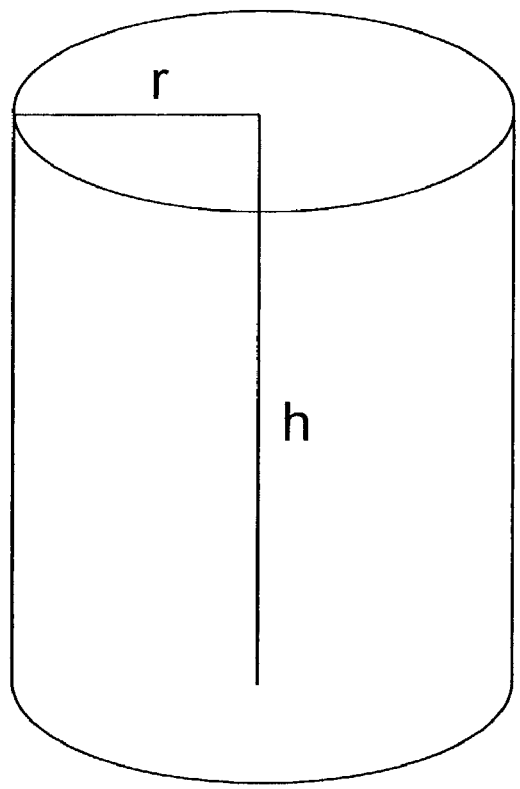

Although the shape of the deep gradient-density filter device shown in FIG. 7B is cylindrical, the present invention can be practiced utilizing various other cross-sectional shapes, provided of course that the other requirements (e.g., thickness, retentive properties, specific filtration material, etc.) of the invention are met. Of possible alternative cross-sectional shapes, square and rectangular shapes are notable candidates. Others exist. Selection will be dictated by such considerations as, for example, flow properties, ease of manufacture, "pooling" propensities, ease of cleaning, and the like.

The collection of filtration media that constitute the deep gradient-density filter device 100 can be assembled together (i.e., held in a fixed predetermined arrangement) with or without the use of an external housing or pressure vessel. Examples of external housings include, but are not limited to cartridges, capsules, boxes, cassettes, columns, and the like; and can be made of variety of materials including, not limited to, stainless steel, high-density polyethylene, aluminum, polyvinyl chloride, polystyrene, polypropylene, glass, and polycarbonate. The housing can be of unitary monolithic form or can comprise several assembled parts. The housing will also be provided with or connectable to at least one fluid inlet and one fluid outlet.

Where a housing is employed, said filtration media will be packed, enclosed, stacked, or otherwise provided therein, together possibly with other elements, such as spacers, screens, fluid distributors, seals, and the like. In general, it is preferred that filtration media be arranged with little or no space between them, in part, to prevent undesirable "liquid hold-up" and to optimize packing density. For biopharmaceutical applications, it has been found that simple stacking the media together so-that they abut under modest mechanical pressure is sufficient.

From the standpoint of simplifying the device 100's structure, and accordingly minimizing its overall manufacturing cost, the filtration media is arranged with no air spaces or other intervening structural element (cf., a spacer) between them. This is not to say the avoidance of such spaces or structures is critical to the practice of the invention. It may be possible to include some of either under certain circumstances without too greatly undermining the functionality of the device. Practitioners may wish to experiment with such alternatives. If spacers or intervening structures are employed, the thicknesses of such are not calculated in determining the total (i.e., summed) thickness of the filtration media.

It is not necessary that an external housing be used in the practice of the present invention under all circumstances. To the contrary, the present inventors find more desirable at this time to construct the filtration media in such a manner as to avoid the need for an external housing. For example, each of the filtration media can be manufactured within an individual framing element, an injection-molded peripheral rim, or like structure, such that when arranged together—for example, between two opposed compression plates—the water-tight fluid pathway needed for the conduct of filtration is formed. In this manner, a practitioner can dispense with obtaining, maintaining, and cleaning a potentially costly housing unit, and instead obtain and replace individual filtration units when needed.

As illustrated in FIG. 1, each the filtration layers of the deep gradient-density filter device 100 can be grouped into three zones. Casual inspection of the device 100 will not necessarily reveal any particularly definitive features that indicate whether a layer belongs to one zone or another, or where one zone starts and another ends. In fact, to a casual observer, each layer of a device may seem remarkably similar to the rest, and thus one can attempt to impose onto the device different "zone constructs", i.e., a "two-zone" device, a "one-zone" device, a "five-zone" device, etc. Absent further definition, the classification of the layers of a multi-layer device into "zones" is subject to potentially endless variation. However, in the present invention, the zones—herein called the pre-filtration zone 20, the primary filtration zone 30, and the polishing zone 40—are circumscribed in respect of certain definitive structural and functional characteristics. The "zone" is thus that which produces or provides such structural and functional characteristics.

It will be appreciated that the deep gradient-density filter device 100 is a stepped gradient filter. Stepped filtration is achieved with larger particles accumulating in the upper filtration layer and smaller contaminants progressively accumulating in the subsequent layers. As such, each of the zones are constructed to trap, retain, or otherwise prevent passage of particles within a predetermined size distribution range, the zones being arranged in descending order of size specificity. Thus, the pre-filtration zone 20 is constructed of layer(s) of filtration material that collectively retain particles within a first size distribution range. The primary filtration zone 30 is constructed of layer(s) of filtration material that collectively retains particles within a second size distribution range, this range involving particles that are as a group smaller that those encompassed by the first size distribution range. Finally, the polishing zone 40 is constructed of layer(s) of filtration material that collectively retains particles within a third size distribution range, this range including a particles that are as a group smaller that those encompassed by the second size distribution range.

As used herein, "retention" shall mean "effective particle retention", i.e., greater than 90% of feed particles at a given size range are removed by filter component. Several methods for determining retention are available to those skilled in the art. For example, the use of calibrated or standardized particle suspensions together will particle counters, such as those based on light-scattering or electrical capacitance or impedance.

Figure 5:
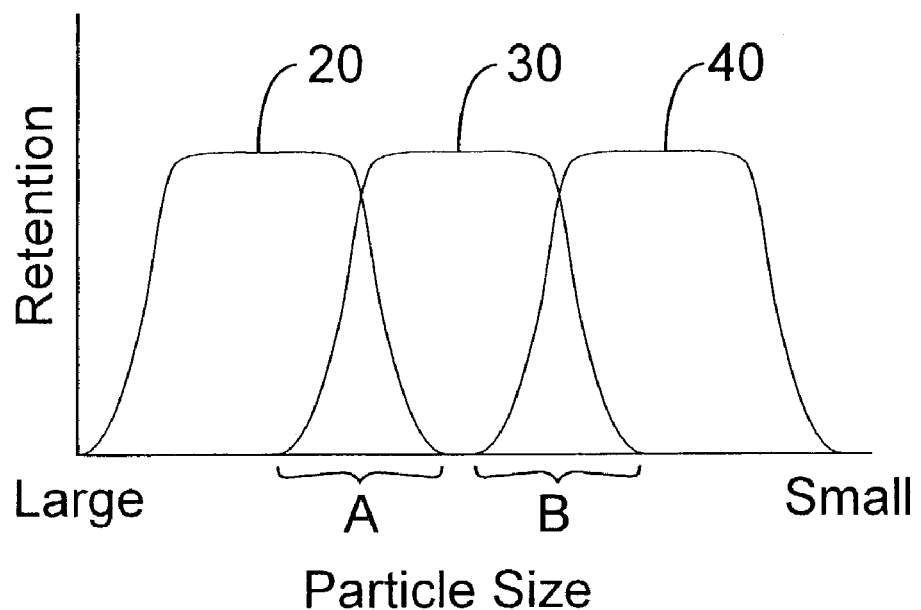
FIG. 5 is an idealized graph representing the particle retention profiles attributable to said pre-filtration zone 20, primary filtration zone 30, and polishing zone 40.

The distribution ranges for each zones will not in practice be subject to any absolute boundaries. It is the nature of filtration science that a filter (particularly, depth filters) rated for exclusion of a certain distribution of particles, will also pass therethrough a few particles within said distribution. Hence, in certain embodiments of the present invention, the retention distribution ranges of the zones 20, 30, and 40 may overlap at their extreme limits of their respective predefined ranges. A certain amount of such overlap is expected and desirable. FIG. 5 provide a graph schematically illustrating the overlapping particle retention profiles attributable respectively to pre-filtration zone 20, primary filtration zone 30, and polishing zone 40. This overlap—exaggerated to a degree in the Figure—occurs at particle size range "A" (i.e., between zones 20 and 30) and at particle size range "B" (i.e., between zones 30 and 40). Despite the likely possibility of such overlap, each zone in practice will perform substantially according to the limits recited herein.

According to its broadest inventive contours, the deep gradient-density filter device 100 is not limited to any preselected numerical retention values of its zones, and subject only to it being a gradient-density filter device and its thickness. However, for biopharmaceutical applications for example, certain specific values have been found to provide desirable results. The deep gradient-density filter device 100 according to this embodiment has a configuration targeted to filter a fluid containing a distribution or particles in the range of approximately 25 microns to approximately 0.2 micron, wherein the materials, the construction of components and sub-components, and the assemblage of zones 20, 30, and 40 enable coverage for selected bands within said range. In particular, the pre-filtration zone 20 provides retention coverage for particles in the range of approximately 25 microns to approximately 1 micron. The primary filtration zone 30 provides retention coverage for particles in the range of approximately 1 micron to approximately 0.3 micron. And finally, the polishing zone provides retention coverage for particles in the range of approximately 0.3 micron to approximately 0.2 micron.

It is possible to obtain the specified retention coverage for each zone by selecting among and utilizing a wide variety of potential materials, construction, and assemblies. Many of these are however unfit and/or impractical. For example, one can provide an extremely retentive zone (i.e., very "tight") comprising several layers of extremely dense filtration material, which under normal operation, would not provide any of the recited coverage. However, by raising the fluid pressure, for example, of said filtration operation to inordinate levels, one may be able to shift its retention values into one of the specified bands of the invention. This is considered inapposite with the objectives of the invention. Hence, in this particular embodiment, in each of the zones 20, 30, and 40, the retention values—as specified above—are established for fluid passing through the zones at a velocity of at least approximately 100 cm/hr and an initial hydraulic permeability of greater than approximately 10 cm/hr/psi.

Figure 2:
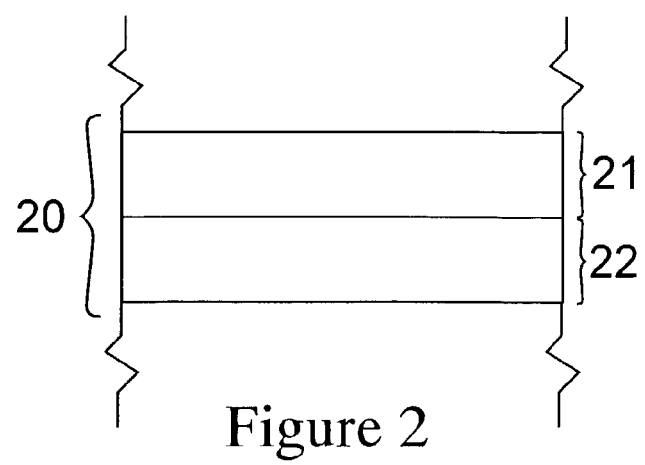
FIG. 2 illustrates schematically one possible construction of the pre-filtration zone 20.
Figure 3:
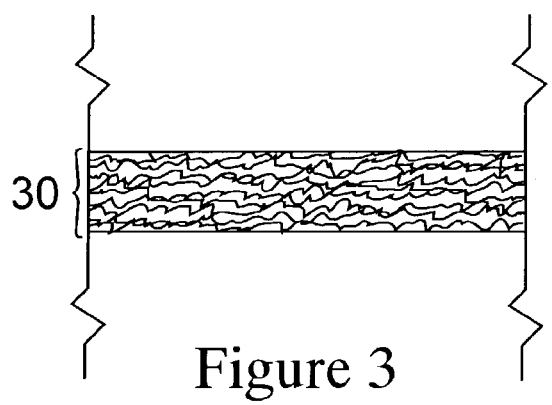
FIG. 3 illustrates schematically one possible construction of the primary filtration zone 30.

FIG. 2 illustrates schematically the pre-filtration zone 20 of the present invention. As shown therein, pre-filtration zone 20 comprises a plurality of layers 22. As it name implies, the general function of the pre-filtration zone 20 is to pre-filter the fluid stream, such that it can be more effectively filtered by the subsequent zones 30 and 40, thus minimizing premature surface fouling and clogging of the more retentive filtration material downstream, and thus extending the useful life of the deep gradient-density filter device 10. In several embodiments of the present invention, deep gradient-density filtration is effected for fluids within the specified particle range without premature formation of a so-called "filter cake" on the surface of the pre-filtration zone 20. The particles that would otherwise form such "filter cake" in prior art devices is captured effectively and comparatively uniformly within the pre-filtration zone 20.

It is presently believed that the performance of the pre-filtration zone 20 is attributable to the "looseness" of its construction. But for its comparatively thicker profile, the comparatively more "open" structure if used in prior art device would lead to unacceptable "flow through" of the specified particle sizes. This "open" structure however, in the present device enables the construction of a much thicker pre-filtration zone, which provide a path length sufficiently long to assures eventually capture of the specified particles in their transit therethrough, whilst not unreasonably impeding or frustrating good fluid velocity at low pressure.

As with the zones of the deep gradient-density filter device 10, the individual layers of the pre-filtration zone 20 have different densities (i.e., pore sizes) and are stacked in decreasing order of pore sizes. An example of one specific construction of the pre-filtration zone 20 is set forth in FIG. 2 and in the following table.

| Layer | Material | Thickness (in.) | Porosity |
|---|---|---|---|
| Layer 21 | Polypropylene Needlefelt (nominal 25 micron rating) | ~0.10 to ~0.15 | As rated. |
| Layer 22 | Polypropylene Needlefelt (nominal 1 micron rating) | ~0.10 to ~0.15 | As rated. |

Although the above table illustrates a pre-filtration zone 20 comprising a specific construction, the invention can be practiced with much broader flexibility. Each of layers 22 can be made of the same materials or different. Preferably, however, each layer 22 is made of the same material, and differ only in respect of their pore size ratings. Type of basic materials that can be employed for this purpose include polypropylene, polyester, glass, polyvinylchloride, polycarbonate polytetrafluoroethylene, polyvinylidene fluoride, cellulose, asbestos, nylon, polyethersulfone, and other polymeric (or non-polymeric) materials.

Aside from the basic materials, the filter materials and media disclosed in the following patents can also be considered: U.S. Pat. No. 4,645,567, issued to K. C. Hou et al. on Feb. 24, 1987; U.S. Pat. No. 4,606,824, issued to C. K. Chu et al. on Aug. 19, 1986; U.S. Pat. No. 4,511,473, issued to K. C. Hou on Apr. 16, 1985; K. C. Hou 4,488,969, issued to K. C. Hou on Dec. 18, 1984; U.S. Pat. No. 5,283,106, issued to K. Seller et al. on Feb. 1,1994; U.S. Pat. No. 4,661,255, issued to G. Aumann et al. on Apr. 28, 1987; and U.S. Pat. No. 3,353,682, issued to D. B. Pall et al. on Nov. 21, 1967.

In general, fibrous materials are preferred, because of its versatility, comparative ease of deposition, its strength imparting properties, internal surface to weight ratio, cost, and because fibers can be oriented in various positions and angles. Further, a great variety of diameters of fibers are available, thus making it possible to achieve an assortment of mixtures of different diameter fibers for making fibrous material of a range of porosity, and such fibers can be made of a range of lengths, so as to take advantage of the greater cohesiveness of a layer of long fibers.

Typical fibrous materials include glass and quartz, asbestos, potassium titanate, colloidal aluminum oxide, aluminum silicate, mineral wool, regenerated cellulose, microcrystalline cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp jute, linen, cotton, silk, wool, mohair, paper, metallic fibers such as iron, copper, aluminum, stainless steel, brass, silver, and titanium, and clays with acicular lath-like or needle-like particles, such as montmorillonite, sepiolite, palygorskite, and attapulgite clays of this type.

The present invention is not limited to any particular morphology for the layers constituting the pre-filtration zone. Regardless, in its currently preferred embodiment, the material is formed as a pad of non-woven synthetic needle-felt. If polypropylene is used, the polypropylene is preferably "virgin" fiber. In other words, the fibers are essentially free of binders, finishing agents, and other adjuvants which often are added to or coated on polypropylene fibers during or after its formation. "Virgin" polypropylene essentially contains no additives other than those inherent in the synthesis of the polypropylene.

The formation of a filter pad or mat can be effected by various conventional techniques, of which mechanical, aerodynamic, or hydrodynamic web formation is used for natural and synthetic staple fibers and filaments and electrostatic formation for very fine denier fibers.

Spunbonded materials,are preferably formed from melt-spun filaments of thermoplastics, e.g., polyethylene, polypropylene, polyamide, or polyester, which are substantially consolidated by needling, a shrinkage treatment, or by the addition of a binder. Advantage may be realized by the spunbonded process in which the filament-forming polymers are in one operation melt-spun and cooled in air streams, drawn and then directly laid in pad or mat form. Spunbonded non-wovens are often desirable for use as filter material on account of their commercial and qualitative advantages over other non-wovens.

For cellulose-based materials, one method of manufacture commences by first preparing a slurry comprising cellulose fibers, filter additives, and a polymeric thermoset binder. The slurry is vacuum felted and then cured at elevated temperature. The cationic resin, when cured, forms a permanent, interconnected rigid structure. The result is a composite structure having a tortuous structure of flow channels and comprising the filter additives embedded in a cellulose matrix.

The non-wovens used for manufacturing the filter are desirably used in the consolidated state. The materials can be consolidated in any conventional manner, for example by thermal bonding under pressure, in which the material is subjected to a calendering treatment, or by needling, or by thermal bonding using binders, such as hot-melt adhesives, for example in fiber or powder form, in which case the hot-melt adhesive must have a melting point which is lower than that of the fiber material of the web, or the pre-consolidation can be effected using a combination of the aforementioned measures.

The filter material under certain circumstances can benefit by the incorporation of non-fiber additives, i.e., so-called "filter aids". These can be incorporated by use of suitable anionic, cationic, or nonionic binding resins. Examples of additives include, but are not limited to, acid-washed diatomaceous earth, perlite, fumed precipitated silica (for hydrophobic absorption); and activated carbon (for absorption certain homones and pyrogens). In addition, these filter aids as well as conventional chromatographic beads can be incorporated into the porous polymeric films, which can be used as part of one or more zones of the deep gradient-density device 100.

Figure 4:
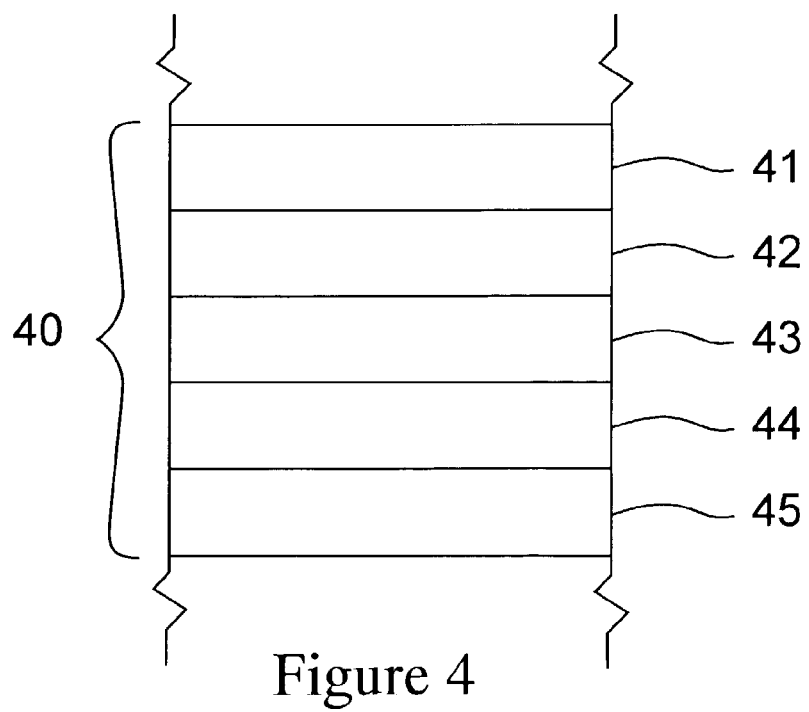
FIG. 4 illustrates schematically one possible construction of the polishing zone 40.

FIG. 4 illustrates the polishing zone 40 of the deep gradient-density filter device 100. The polishing zone, in one preferred embodiment, comprises several layers of filtration material, arranged, constructed, and assembled whereby they collectively will retain substantially solid particles in the size range of approximately 0.3 micron to approximately 0.2 micron, or more broadly, particles that pass through primary filtration zone 30. As its name implies, the essential function provided by the polishing zone is to complete the filtration of a fluid, so that, for example, in the case of biopharmaceutical manufacture, the fluid can be further and effectively processed under subsequent sterile filtration or chromatographic protocols. The particle range tolerated by typical sterile filtration or chromatographic processes is in the order of about 0.2 micron.

The layers of filtration material used for polishing zone 40 can be made of a variety of materials. The materials may be the same or different amongst the constituent layers, but typically they will be the same, with the layers differing in respect of their porosity. The layers are arranged in decreasing order of porosity. Each layer is approximately 3 to approximately 5 millimeters in thickness. Collectively, the polishing zone 40 is approximately 10 to approximately 20 millimeters in thickness. In a preferred embodiment, each layer is made of wet-laid cellulose containing pad or sheet. An example of specific construction of the polishing zone 40 is set forth in the following table:

| Layer | Material | Thickness (in.) | Permeability (LMH/psi) |
|---|---|---|---|
| Layer 41 | Wet-laid pad comprising cellulose wood pulp and diatomaceous earth (Manufacturer's Grade 925)* | ~0.10 to ~0.15 | ~140 to ~260 |

-continued

| Layer | Material | Thickness (in.) | Permeability (LMH/psi) |
|---|---|---|---|
| Layer 42 | Wet-laid pad comprising cellulose wood pulp and diatomaceous earth (Manufacturer's Grade 935)* | ~0.10 to ~0.15 | ~68 to ~120 |
| Layer 43 | Wet-laid pad comprising cellulose wood pulp and diatomaceous earth (Manufacturer's Grade 945)* | ~0.10 to ~0.15 | ~300 to ~560 |
| Layer 44 | Wet-laid pad comprising cellulose wood pulp and diatomaceous earth (Manufacturer's Grade 955)* | ~0.10 to ~0.15 | ~140 to ~260 |
| Layer 45 | Wet-laid pad comprising cellulose wood pulp and diatomaceous earth (Manufacturer's Grade 965)* | ~0.10 to ~0.15 | ~70 to ~120 |

*Available from GusmerCellulo, Inc., of Mountainside, New Jersey 07092.

Other materials that can be used to make the layers of the polishing zone 40 include, in general, many of the same materials, morphologies, and formats listed in respect of the pre-filtration zone, with the exception that the nominal pore size ranges will be substantially smaller. Multiple microporous polymeric membranes can also be utilized.

In certain embodiments, much of the efficacy of the deep gradient-density filter device appears attributed to the manufacture, composition, and configuration of the primary filtration zone 30. In particular, in such embodiments, the primary filtration zone 30 comprises at least one layer of fibrillated fiber-containing material. As in other embodiments, the primary filtration zone 30 is interposed between a pre-filtration zone 20 and a polishing zone 40, each zone configured to retain a specific size distribution range of particles, the zones becoming progressively "tighter" and "less open" from one end of the device to the other.

As used herein "fibrillated fiber" means fiber that is frayed or split along its length or a fiber wherein the ends are split and splayed out, resulting in a multitude of very fine fibrils upon a core fiber. The smaller and thinner fibers or fibrils formed on the core fiber by the fraying or splitting are known as "fibrillae". The fibrillated fibers used in the invention can be formed from fibers that are axially oriented and are less strongly bonded in the transverse direction, such as wood, and certain synthetic fibers described below.

One commonly known fiber that can be fibrillated is wood fiber, which may be fibrillated by controlling the conditions under which the fiber is cut. The fibrillating of wood fiber is explained by Julino Grant in Laboratory Handbook of Pulp and Paper Manufacture, 2nd Edition, 1961, Great Britain, at pp. 147–152.

Another commonly known fiber that can be fibrillated is cotton. Although the present invention is not limited to the use of highly-fibrillated cotton fiber, several embodiments using such fiber have been produced and have been shown to provide good results. Such material is commercially available. For example, high surface area fibrillated cotton fiber can be obtained from GusmerCellulo, Inc., of Mountainside, N.J. 07092. Alternatively, the patent literature provides several disclosures on the process for fibrillating cotton fiber. For example, U.S. Pat. No. 4,761,203, issued to K. D. Vinson on Aug. 2, 1991, discloses fine slurry impaction as a method for mechanically expanding a fiber.

Fibrillated fibers made from synthetic materials are also contemplated for use in the invention. Examples of synthetic fibrillated fibers and methods for making them are disclosed in U.S. Pat. No. 3,097,991, issued to W. A. Miller et al. on Jul. 16, 1963, and U.S. Pat. No. 3,560,318, issued to W. A. Miller et al. on Feb. 2, 1971. Processes for making synthetic fibrillated fibers typically involve the cutting and beating of a fiber of a film of an oriented polymer in, for example, a paper beater or refiner.

Synthetic polymers can be formed into oriented films or fibers by methods known in the art. These typically involve the controlling of the extrusion process and/or a stretching process to orient the polymer in the film or fiber. The oriented fibers or films must be stronger in an axial direction and weaker in a transverse direction (to an extent) to allow fibrillation. Optionally, the polymer can be co-extruded with an incompatible polymer, as is described in the above cited patents, to more readily form a fiber or film that is strong in an axial direction and weak in a transverse direction. This can be accomplished by addition of the incompatible polymer to the polymer melt or the polymer solution or "dope" that is to be extruded. Certain polymers such as poly(imino-1,4-phenyleneiminoterephthaloyl), described below, may be formed in a highly oriented state with long, strong, axial, "grains" separated by weaker amorphous regions, and may not require the use of an incompatible polymer to form fibrillable fibers. The formation of fibrillated fiber from synthetic polymers is well know in the art.

The fibrillated fibers used in the invention should be fibrillated to provide a surface area greater than about 1 square meter per gram, preferably greater than about 10 square meters per gram. The surface area is measured by the B-E-T method described in Brunauer, et al. in J. Am. Chem. Soc., 60, 309 (1938).

In one current configuration, the primary filtration zone 30 comprises a single layer of fibrillated cotton fiber. More particularly, "loose" fibrillated cotton fiber is "sandwiched" between layers of non-woven synthetic fiber pads (front side) and wet-laid cellulosic sheets (back side) that make up the pre-filtration zone 20 and polishing zone 40, respectively. Since, the fibrillated fibers are loose, only a single layer (or stratum) is present. However, technologies are available by which the loose fibers can be fixed into a pad-like structure. For example, one can use binders, preferably sparingly, so as not to reduce the functionally available surface area of the fibers. Alternatively, the fibers can be packed within an enclosed mesh envelope (cf., a teabag). If unitized as such, the fibrillated fiber units can be employed as a single layer or as multiple layers.

The deep gradient-density filter device, in view of the flexibility and modifiability of its specific construction can be employed in various fluid processing applications. Of these, one particularly novel use is in the post-fermentation or post-culture biopharmaceutical fluid clarification.

The deep gradient-density filter device 100 can be employed in a broad variety of filtration applications. Types of industrial applications include, for example, pharmaceutical manufacture, processing blood plasma or serum fractionation products, ophthalmic solution manufacture, the manufacture of specialty chemicals, and the like. Despite such applications, the type of activity for which the deep gradient-density filter device 10 is particularly well targeted is in the primary or secondary clarification of raw cellular culture suspensions.

Aligned with unique features of its product embodiments, the present invention provides a method for effectively and efficiently clarifying a manufactured protein-containing biopharmaceutical fluid, in particular a protein-rich cultured or fermented cellular broth. Although methods of clarification are known, the inventive method is characterized by its unprecedented operating regime, i.e., operation at pressures and fluid velocities not before employed with fluid of such high solids concentration and small particle size range (cf., substantially less than one micron).

The ultimate goal of the methodology is to separate the protein-rich fluid from the cellular culture broth debris, which typically contain cells, organelles, and fragments thereof, as well as other particulate and/or solid matter. In so-called pilot scale manufacture (e.g., batches of generally under a thousand liters), the deep gradient-density filter device 10 can be employed immediately after the fermentation or culture of the biopharmaceutical fluid (i.e., so-called "primary clarification"). In so-called industrial scale manufacture (e.g., batches generally in the order of several thousands of liters), the great amount of debris found in such fluids will generally be first removed by other primary clarifications methods such as, for example, centrifugation. The pre-clarified broth can then be subsequently clarified (e.g., so-called "secondary clarification") by the deep gradient-density filter device 10 without substantial incidence of premature plugging.

In the typical bio-industrial procedures, the intent is to remove all of the cellular debris from the fluid, passing all protein. Applicant however believes that the extent of removal is discretional and will depend on a user's needs. Accordingly, the invention should not be limited to any quantified criterion for retention and removal, but rather, the inventive methodology is performed essentially with "substantial" isolation.

As stated, the manufactured protein-containing solution is conducted through said deep gradient-density filtration device under conditions sufficient to effect passage of said protein through each of its zones. By this step, any solid macroscopic debris of the cellular host colony or broth is separated from the protein-containing solution, said debris being substantially prevented from passage through device 10's matrix of filtration media.

The protein-containing solution treated under the inventive method are those typically extracted from industrially-manufactured cell cultures for the purpose of accessing, for example, the biopharmaceutical activity of said protein. Many of these proteins are quite complex in their structure, and are increasingly used in research, diagnostics, and therapeutics.

The exact constituency of the protein-containing solution does not limit the scope of the inventive methodology. However, the present invention does not seek to capture all types of protein-containing fluids. Rather, the inventive methodology is drawn to a "manufactured" protein-containing solution. It is "manufactured" in the sense that the protein contained in said solution is present in a form and/or concentration that does not naturally exist, for example, it occurs in enriched concentration (i.e., a concentration that does not occur naturally or spontaneously without human intervention) or otherwise has detectable genetically-engineered features. Such scope is best understood in consideration of the basic elements of biopharmaceutical manufacture.

While the field is still comparatively new, and thus subject to change, two processes for producing therapeutically-active or otherwise biologically-significant proteins are commonly-employed—though others exist—in the biopharmaceutical arena: i.e., the secretion of monoclonal antibodies from cloned hybridoma cell lines, and the synthesis of proteins using recombinant DNA technologies.

Monoclonal antibodies are produced by fusing single antibody-forming cells to tumor cells grown in culture. The resulting cell is called a hybridoma. Each hybridoma produces relatively large quantities of identical antibody molecules. By allowing the hybridoma to multiply in culture, it is possible to produce a population of cells, each of which produces identical antibody molecules. These antibodies are called "monoclonal antibodies" because they are produced by the identical offspring of a single, cloned antibody producing cell. With the advent of hybridoma technology and other progress in genetic engineering of eucaryotic cells, mammalian or yeast cell lines are becoming the method of choice for producing complex proteins on a large scale.

Recombinant DNA technology involves the integration of a specific DNA fragment into a rapidly replicating genetic element (e.g., a plasmid) so that it can be amplified in bacteria or yeast cells. These cells multiply in culture, each containing the protein-coding plasmid. Translation of the DNA fragment on the plasmid yields the protein-encoded therein.

The deep gradient-density filter device is used for filtration of manufactured protein-containing solutions resultant of either the monoclonal antibody or recombinant DNA technologies. Because of the design of the novel deep gradient-density filter device 100, the method is capable of being operated for longer periods of time before it becomes necessary to replace modules, the filtration material thereof being spent, essentially becoming far too plugged with particles to be used further. As practitioners in the art will appreciate, there is great value to be realized in reducing replacement cycles, as every replacement will typically require "shut down", for maintenance, cleaning, and testing, before recommencing operation. One should reduce the frequency of such down-time, otherwise productivity suffers, which ultimately raises the cost to the consumer of the pharmaceutical product and/or reduce its supply.

While only a few illustrative embodiments of the present invention have been discussed, it is understood that various modification will be apparent to those skilled in the art in view of the description herein. All such modifications are within the spirit and scope of the invention as encompassed by the following claims.

The invention claimed is:

1. A deep gradient-density filter device having a depth of at least approximately 0.5 inch (1.27 cm.) and capable of filtering a fluid containing a distribution of particles in the range of approximately 25 microns to approximately 0.2 micron, the deep gradient-density filter device comprising in order:
   (a) a pre-filtration zone comprising layers of filtration material, said pre-filtration zone capable of retaining particles in the range of approximately 25 microns to approximately 1 micron,
   (b) a primary filtration zone comprising filtration material, said primary filtration zone capable retaining particles in the range of approximately 1 micron to approximately 0.3 micron, and
   (c) a polishing zone comprising layers of filtration material, said polishing zone capable of retaining particles in the range of approximately 0.3 micron to approximately 0.2 micron; and
   wherein the retention capabilities of the pre-filtration zone, the primary filtration zone, and the polishing zone, as recited in (a), (b), and (c) respectively, are established at a fluid velocity of at least approximately 100 cm/hr and an initial hydraulic permeability of greater than approximately 10 cm/hr/psi.

2. The deep gradient-density filter device of claim 1, wherein said primary filtration zone comprises at least one layer of fibrillated fiber containing material.

3. The deep gradient-density filter device of claim 1, wherein said pre-filtration zone comprises:
   (i) a layer of non-woven fiber material having an approximately 25 micron nominal pore rating; and
   (ii) a layer of non-woven fiber material having an approximately 1 micron nominal pore rating.

4. The deep gradient-density filter device of claim 3, wherein said layers (i) and (ii) of said primary filtration zone are both substantially made of propylene fiber material, and both have a thickness within the range of approximately 0.10 inch (0.254 cm.) to approximately 0.15 inch (0.381 cm).

5. The deep gradient-density filter device of claim 3, wherein said primary filtration zone comprises at least one layer of fibrillated fiber containing material.

6. The deep gradient-density filter device of claim 5, wherein said polishing zone comprises:
   (i) a wet-laid layer of cellulose and diatomaceous earth having a permeability of approximately 140 to approximately 260 LMH/psi;
   (ii) a wet-laid layer of cellulose and diatomaceous earth having a permeability of approximately 68 to approximately 120 LMH/psi;
   (iii) a wet-laid layer of cellulose and diatomaceous earth having a permeability of approximately 300 to approximately 560 LMH/psi;
   (iv) a wet-laid layer of cellulose and diatomaceous earth having a permeability of approximately 140 to approximately 260 LMH/psi; and
   (v) a wet-laid layer of cellulose and diatomaceous earth having a permeability of approximately 70 to approximately 120 LMH/psi.

7. The deep gradient-density filter device of claim 6, wherein said layers (i), (ii), (iii), (iv), and (v) of said polishing zone each have a thickness within the range of approximately 0.10 inch (0.254 cm.) to approximately 0.15 inch (0.381 cm).

8. A biopharmaceutical fluid processing methodology comprising the steps of:
   providing a manufactured protein-containing solution comprising a synthetically-enriched concentration of a predetermined target protein and a distribution of solid particles of differing sizes;
   providing a deep gradient-density filter device comprising abutting layers of filtration materials that collectively have a depth of at least approximately a half-inch; and
   passing said manufactured protein-containing solution through said deep gradient-density filter device at a velocity of at least approximately 100 cm/hr.

9. The biopharmaceutical fluid processing methodology of claim 8,
   wherein said abutting layers of filtration material of said deep gradient-density filter device define a pre-filtration zone, and primary filtration zone, and a polishing zone;
   wherein said pre-filtration zone is capable of retaining particles in the range of approximately 25 microns to approximately 1 micron, said primary filtration zone is capable retaining particles in the range of approximately 1 micron to approximately 0.3 micron, and said polishing zone is capable of retaining particles in the range of approximately 0.3 micron to approximately 0.2 micron; and
   wherein the retention capabilities of the pre-filtration zone, the primary filtration zone, and the polishing zone are established at a fluid velocity of at least approximately 100 cm/hr and an initial hydraulic permeability of greater than approximately 10 cm/hr/psi.

10. The biopharmaceutical fluid processing methodology of claim 8,
    wherein said abutting layers of filtration material of said deep gradient-density filter device define a pre-filtration zone, and primary filtration zone, and a polishing zone; and
    wherein said pre-filtration zone is capable of retaining particles within a first size distribution range; said primary filtration zone comprises at least one layer of fibrillated fiber containing material and is capable of retaining particles within a second size distribution range smaller than said first size distribution range, and said polishing zone is capable of retaining particles within a third size distribution range smaller than said second size distribution range.

11. A deep gradient-density filter device comprising in order:
    a pre-filtration zone comprising layers of filtration material, said pre-filtration zone capable of retaining particles within a first size distribution range;
    a primary filtration zone comprising at least one layer of fibrillated fiber containing material, said primary filtration zone capable of retaining particles within a second size distribution range, said second size distribution range being smaller than said first size distribution range; and
    a polishing zone comprising layers of filtration material, said polishing zone capable of retaining particles within a third size distribution range, said third size distribution range being smaller than said second size distribution range.

12. The deep gradient-density filter device of claim 11,
    wherein the device is capable of filtering a fluid containing a distribution of particles in the range of approximately 25 microns to approximately 0.2 micron; and
    wherein said first size distribution range is approximately 25 microns to approximately 1 micron, said second size distribution range is approximately 1 micron to approximately 0.3 micron, and said third size distribution range is approximately 0.3 micron to approximately 0.2 micron; and
    wherein the retention capabilities of the pre-filtration zone, the primary filtration zone, and the polishing zone are established at a fluid velocity of at least approximately 100 cm/hr and an initial hydraulic permeability of greater than approximately 10 cm/hr/psi.

13. The deep gradient-density filter device of claim 11, wherein said pre-filtration zone comprises:
    (i) a layer of non-woven fiber material having an approximately 25 micron nominal pore rating; and
    (ii) a layer of non-woven fiber material having an approximately 1 micron nominal pore rating.

14. The deep gradient-density filter device of claim 13, wherein said layers (i) and (ii) of said primary filtration zone are both substantially made of propylene fiber material.

15. The deep gradient-density filter device of claim 13, wherein said polishing zone comprises:
    (i) a wet-laid layer of cellulose and diatomaceous earth having a permeability of approximately 140 to approximately 260 LMH/psi;
    (ii) a wet-laid layer of cellulose and diatomaceous earth having a permeability of approximately 68 to approximately 120 LMH/psi;

(iii) a wet-laid layer of cellulose and diatomaceous earth having a permeability of approximately 300 to approximately 560 LMH/psi;

(iv) a wet-laid layer of cellulose and diatomaceous earth having a permeability of approximately 140 to approximately 260 LMH/psi; and (v) a wet-laid layer of cellulose and diatomaceous earth having a permeability of approximately 70 to approximately 120 LMH/psi.

* * * * *